United States Patent
Aoi et al.

(10) Patent No.: US 9,738,785 B2
(45) Date of Patent: Aug. 22, 2017

(54) PLASTIC MOLDING COMPOSITION AND SINTERED PRODUCT

(71) Applicant: DENSO CORPORATION, Kariya, Aichi-pref. (JP)

(72) Inventors: Yasuki Aoi, Gifu (JP); Mayumi Ozeki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 158 days.

(21) Appl. No.: 13/898,708

(22) Filed: May 21, 2013

(65) Prior Publication Data

US 2013/0312637 A1    Nov. 28, 2013

(30) Foreign Application Priority Data

May 22, 2012  (JP) ................. 2012-116491

(51) Int. Cl.
*C08L 89/00* (2006.01)
*C08L 89/06* (2006.01)

(52) U.S. Cl.
CPC .............. *C08L 89/00* (2013.01); *C08L 89/06* (2013.01)

(58) Field of Classification Search
None
See application file for complete search history.

(56) References Cited

U.S. PATENT DOCUMENTS

| | | | |
|---|---|---|---|
| 4,734,237 A | 3/1988 | Fanelli | |
| 2010/0094230 A1* | 4/2010 | Dujardin | A61L 29/16 604/265 |
| 2011/0215500 A1* | 9/2011 | Farrell | 264/219 |

FOREIGN PATENT DOCUMENTS

| | | |
|---|---|---|
| JP | 02-225359 | 9/1990 |
| JP | 06-226718 | 8/1994 |
| JP | 2007154162 A * | 6/2007 |

OTHER PUBLICATIONS

U.S. Appl. No. 13/898,698, filed May 21, 2013, Aoi et al.
Office action dated Apr. 22, 2014 in corresponding Japanese Application No. 2012-116491.

* cited by examiner

Primary Examiner — Melissa Swain
(74) Attorney, Agent, or Firm — Harness, Dickey & Pierce, P.L.C.

(57) ABSTRACT

A plastic molding composition includes a powder, gelatin, a polar solvent, and an adhesion reducer. The powder contains at least one of a ceramic particle and a metal particle. The adhesion reducer reduces adhesion of the gelatin so that a molded product, which is molded from the composition with a molding die, is removed from the molding die without being broken. The adhesion reducer is a water-soluble or water-dispersible compound. The adhesion reducer has a HLB value, calculated by Griffin's method, ranging from 10 to 20.

7 Claims, 2 Drawing Sheets

| | | CLASSIFICATION | NAME | HLB | EVALUATION |
|---|---|---|---|---|---|
| EMBODIMENT | 3 | POLYALKYLENE GLYCOL | POLYOXYETHYLENE GLYCOL | 20.00 | O |
| | 4 | POLYALKYLENE GLYCOL DERIVATIVE | URETHANE MODIFIED POLYETHER | 18.27 | O |
| | 5 | POLYALKYLENE GLYCOL DERIVATIVE | POLYOXYETHYLENE MONOALKYL ETHER | 16.83 | O |
| | 6 | POLYALKYLENE GLYCOL DERIVATIVE | POLYOXYETHYLENE POLYOXYPROPYLENE GLYCOL | 15.04 | O |
| | 7 | POLYCARBOXYLATE | POLYCARBOXYLIC ACID AMMONIUM SALT | 13.93 | O |
| | 8 | POLYCARBOXYLIC ACID | POLYCARBOXYLIC ACID COPOLYMER | 12.49 | O |
| | 9 | SUGAR DERIVATIVE | CELLULOSE DERIVATIVE | 12.31 | O |
| | 10 | SUGAR ALCOHOL | SORBITOL | 11.20 | O |
| | 11 | SUGAR ALCOHOL | MALTITOL | 10.75 | O |
| | 12 | SUGAR DERIVATIVE | OLIGOSACCHARIDE DERIVATIVE | 10.24 | O |
| COMPARISON EXAMPLE | 1 | SYNTHETIC RESIN | ACRYLIC RESIN | 8.79 | × |
| | 2 | SYNTHETIC RESIN | POLYVINYL ALCOHOL | 8.25 | × |
| | 3 | FATTY ACID | STEARIC ACID | 3.16 | × |
| | 4 | SYNTHETIC RESIN | POLYVINYL BUTYRAL | 0.6 | × |

FIG. 1

| | | CLASSIFICATION | NAME | HLB | EVALUATION |
|---|---|---|---|---|---|
| EMBODIMENT | 3 | POLYALKYLENE GLYCOL | POLYOXYETHYLENE GLYCOL | 20.00 | ○ |
| | 4 | POLYALKYLENE GLYCOL DERIVATIVE | URETHANE MODIFIED POLYETHER | 18.27 | ○ |
| | 5 | POLYALKYLENE GLYCOL DERIVATIVE | POLYOXYETHYLENE MONOALKYL ETHER | 16.83 | ○ |
| | 6 | POLYALKYLENE GLYCOL DERIVATIVE | POLYOXYETHYLENE POLYOXYPROPYLENE GLYCOL | 15.04 | ○ |
| | 7 | POLYCARBOXYLATE | POLYCARBOXYLIC ACID AMMONIUM SALT | 13.93 | ○ |
| | 8 | POLYCARBOXYLIC ACID | POLYCARBOXYLIC ACID COPOLYMER | 12.49 | ○ |
| | 9 | SUGAR DERIVATIVE | CELLULOSE DERIVATIVE | 12.31 | ○ |
| | 10 | SUGAR ALCOHOL | SORBITOL | 11.20 | ○ |
| | 11 | SUGAR ALCOHOL | MALTITOL | 10.75 | ○ |
| | 12 | SUGAR DERIVATIVE | OLIGOSACCHARIDE DERIVATIVE | 10.24 | ○ |
| COMPARISON EXAMPLE | 1 | SYNTHETIC RESIN | ACRYLIC RESIN | 8.79 | × |
| | 2 | SYNTHETIC RESIN | POLYVINYL ALCOHOL | 8.25 | × |
| | 3 | FATTY ACID | STEARIC ACID | 3.16 | × |
| | 4 | SYNTHETIC RESIN | POLYVINYL BUTYRAL | 0.6 | × |

FIG. 2

|  | MIXING RATIO A (PARTS BY WEIGHT) | MIXING RATIO B (PARTS BY WEIGHT) | EVALUATION |
|---|---|---|---|
| COMPARISON EXAMPLE 5 | 0.04 | 0.5 | × |
| EMBODIMENT 13 | 0.05 | 0.6 | ○ |
| EMBODIMENT 14 | 10 | 118 | ○ |
| COMPARISON EXAMPLE 6 | 11 | 129 | × |

FIG. 3

|  | MIXING RATIO A (PARTS BY WEIGHT) | MIXING RATIO B (PARTS BY WEIGHT) | EVALUATION |
|---|---|---|---|
| COMPARISON EXAMPLE 7 | 0.04 | 0.5 | × |
| EMBODIMENT 15 | 0.05 | 0.6 | ○ |
| EMBODIMENT 16 | 10 | 118 | ○ |
| EMBODIMENT 17 | 11 | 129 | ○ |
| COMPARISON EXAMPLE 8 | 12 | 141 | × |

FIG. 4

|  | MIXING RATIO A (PARTS BY WEIGHT) | MIXING RATIO B (PARTS BY WEIGHT) | EVALUATION |
|---|---|---|---|
| COMPARISON EXAMPLE 9 | 0.04 | 0.5 | × |
| EMBODIMENT 18 | 0.05 | 0.6 | ○ |
| EMBODIMENT 19 | 10 | 118 | ○ |
| EMBODIMENT 20 | 11 | 129 | ○ |
| COMPARISON EXAMPLE 10 | 12 | 141 | × |

US 9,738,785 B2

PLASTIC MOLDING COMPOSITION AND SINTERED PRODUCT

CROSS REFERENCE TO RELATED APPLICATION

This application is based on Japanese Patent Application No. 2012-116491 filed on May 22, 2012, the disclosure of which is incorporated herein by reference.

FIELD

The present disclosure relates to a composition for plastic molding and also relates to a sintered product manufactured by sintering a molded product which is molded from the composition.

BACKGROUND

In a conventional method of manufacturing a sintered product, a molded product is formed by injection molding of a metal or ceramic powder and then sintered to form the sintered product. Generally, in injection molding of a metal or ceramic powder, a plastic molding composition is prepared by mixing the powder with a large amount of binder resin (binding agent) and used. In this case, in order to pour the composition in a molding die, the composition is heated to a temperature of, for example, 200° C. It is noted that when the binder resin is used, the sintered product is broken if the molded product is sintered directly. Therefore, a degreasing process, in which the molded product is heated to a temperature of from 500° C. to 600° C. to decompose the binder resin, needs to be performed before the molded product is sintered.

U.S. Pat. No. 4,734,237 corresponding to JP-B-2,604,592 discloses using a small amount of agar and water as a binder instead of binder resin. This approach can allow the composition to have flowability by heating the composition to a temperature of 80° C. to 100° C. Further, since the amount of the binder contained in the molded product is small, the degreasing process can become unnecessary.

SUMMARY

The present inventors considered using gelatin instead of agar as a binder for injection molding of a metal or ceramic powder for reasons below.

When agar is used as a binder, a temperature of 80° C. or more is necessary to solate the agar so that the composition can have flowability. However, water, which is used as a solvent for the agar, vaporizes easily at this temperature. Therefore, water contained in the composition vaporizes during a process where the composition is prepared and during a process where the composition is injected in a molding die to form a molded product. Accordingly, the amount of water in the composition is likely to vary. Since the dimension of the sintered product can vary depending on the amount of water in the composition, a variation in the dimension of the sintered product can occur.

Generally, a solation temperature of gelatin is in a range from 10° C. to 50° C. When gelatin is heated to a temperature, higher than the solation temperature, gelatin is solated. Therefore, compared to when agar is used, the composition can have flowability at a lower heating temperature by using gelatin and water as a binder. Accordingly, the variation in the amount of water in the composition can be reduced.

The present inventors actually tried to inject a composition, in which gelatin and water are used as a binder, in a molding die and harden the composition in the molding die. As a result, the present inventors found out that demoldability of the composition is bad due to excessive adhesion of gelatin. That is, since the molded product is tightly adhered to the molding die, it is hard to remove the molded product from the molding die. The molded product may be broken if the molded product is forced to be removed from the molding die. This problem can occur not only in an injection molding method but also in other molding methods that use a molding die. Although a polar solvent such as alcohol can be used as a solvent for gelatin instead of water, the above problem can occur even in such a case.

In view of the above, it is an object of the present disclosure to provide a plastic molding composition containing gelatin as a binder and having improved demoldability.

According to an aspect of the present disclosure, a plastic molding composition includes a powder, gelatin, a polar solvent, and an adhesion reducer. The powder contains at least one of a ceramic particle and a metal particle. The adhesion reducer reduces adhesion of the gelatin so that a molded product, which is molded from the composition with a molding die, is removed from the molding die without being broken. The adhesion reducer is a water-soluble or water-dispersible compound and has a HLB value, calculated by Griffin's method, ranging from 10 to 20.

Since the adhesion reducer in the composition improves demoldability of the composition, the molded product can be removed from the molding die without being broken. Thus, a sintered product can be manufactured by sintering the molded product.

BRIEF DESCRIPTION OF THE DRAWINGS

The above and other objects, features and advantages of the present disclosure will become more apparent from the following detailed description made with reference to the accompanying drawings. In the drawings:

FIG. 1 is a diagram illustrating evaluation results of demoldability of compositions according to embodiments 3-12 of the present disclosure and comparison examples 1-4, FIG. 2 is a diagram illustrating evaluation results of demoldability of compositions according to embodiments 13-14 of the present disclosure and comparison examples 5-6, FIG. 3 is a diagram illustrating evaluation results of demoldability of compositions according to embodiments 15-17 of the present disclosure and comparison examples 7-8, and FIG. 4 is a diagram illustrating evaluation results of demoldability of compositions according to embodiments 18-20 of the present disclosure and comparison examples 9-10.

DETAILED DESCRIPTION

A plastic molding composition according to the present disclosure is a mixture of a raw powder, gelatin, a polar solvent, and an adhesion reducer. The raw powder is a raw material of a sintered product which is manufactured by sintering a molded product which is molded from the composition using a molding die. The raw powder contains at least one of a ceramic particle and a metal particle.

Examples of the ceramic particle include an alumina particle and a zirconia particle. The raw powder can contain both a ceramic particle and a metal particle. Alternatively, the raw powder can contain only a ceramic particle without a metal particle. Alternatively, the raw powder can contain only a metal particle without a ceramic particle.

The raw powder can contain different types of ceramic particles. Likewise, the raw powder can contain different types of metal particles.

The gelatin is a binder (i.e., binding agent) and used by dissolving a gelatin powder into the polar solvent.

The gelatin is manufactured by hydrolyzing collagen. For example, the collagen can be produced from a bone, a skin, a ligament, or a tendon of an animal. A solation temperature and a gelation temperature of the gelatin fall within a range from 10 to 50° C. The gelatin solates (i.e., changes to sol form) at a temperature not lower than the solation temperature and gelates (i.e., changes to gel form) at a temperature not higher than the gelation temperature. Examples of the gelatin include acid-treated beef bone gelatin, alkali-treated beef bone gelatin, and acid-treated pork skin gelatin. In some countries, including Japan, a poorly-refined gelatin is called as the "glue". The glue can be included in the gelatin defined in the specification.

The polar solvent is a solvent for dissolving the gelatin. Examples of the polar solvent include water and alcohol. If a solvent other than water is used, it is preferable that a solvent having volatility equal to or lower than that of water should be used.

The adhesion reducer reduces adhesion of the gelatin so that the molded product can be removed from the molding die without being broken. For example, a water-soluble or water-dispersible compound having a HLB (Hydrophile-Lipophile Balance) value ranging from 10 to 20 can be used as the adhesion reducer. The HLB value is calculated by a Griffin's method.

A reason for using a water-soluble or water-dispersible compound is that such a compound is not separated from the polar solvent in the composition and the gelatin, which is hydrophilic. It is noted that a water-soluble or water-dispersible compound is not separated from the polar solvent, even when the polar solvent is different from water.

The compound can be in either solid or liquid form. Assuming that the compound in liquid form is used, when the volatility of the compound is equal to or lower than that of water, a variation in the amount of the solvent in the composition during a process where the composition is prepared and during a process where the composition is injected in the molding die can be reduced. Incidentally, since the vapor pressure of water at 20° C. is 2300 Pa, the compound in liquid form having the vapor pressure equal to or less than that of water at the same temperature can be used.

The HLB value is a measure to indicate, a balance between a hydrophilic property and a hydrophobic property. The HLB value can range from 0 to 20. As the HLB value approaches 0, the hydrophobic property is higher. As the HLB value approaches 20, the hydrophilic property is higher. According to the Griffin's method, the HLB value is given by the following formula: HLB value=20×(the formula weight of the hydrophilic group/the molecular weight).

For example, in the case of HO–(EO)$_n$–(PO)$_m$–H, the formula weight of the hydrophilic group is the formula weight of the OH group at each end and the (EO)$_n$.

When a compound having a HLB value of 10 or more is added to the composition containing the raw powder, the gelatin, and the polar solvent, the molded product, which is formed from the composition injected in the molding die, can be removed from the molding die without being broken. As shown in embodiments described later, this was experimentally discovered by the present inventors.

Examples of this type of compound include polyalkylene glycol, polyalkylene glycol derivative, polycarboxylate, sugar alcohol, and sugar derivative. One compound selected from these can be used. Alternatively, two or more compounds of the same or different types selected from these can be used.

The HLB value of polyalkylene glycol or polyalkylene glycol derivative with an ethylene oxide structure is large. Therefore, where polyalkylene glycol or polyalkylene glycol derivative is used, it is preferable that polyalkylene glycol or polyalkylene glycol derivative should have an ethylene oxide structure. Examples of polyalkylene glycol or polyalkylene glycol derivative with an ethylene oxide structure include polyoxyethylene glycol, urethane modified polyether, polyoxyethylene monoalkyl ether, and polyoxyethylene polyoxypropylene glycol.

A ratio of the gelatin and the polar solvent in the composition is determined based on a jelly strength of the gelatin, a target strength of a hardened molded product, and a viscosity of the composition. For example, the ratio can be 100 parts by weight of the raw powder, 3 to 20 parts by weight of the gelatin, and 6.5 to 22 parts by weight of water.

Regarding a ratio of the adhesion reducer in the composition, if the ratio of the adhesion reducer in the composition is too low, an effect of allowing the molded product to be removed from the molding die without being broken cannot be obtained. Therefore, the ratio of the adhesion reducer in the composition is determined so that this effect can be obtained. In contrast, if the ratio of the adhesion reducer in the composition is too high, the binder's function of binding the particles of the raw powder together is weakened so that the shape of the molded product cannot be maintained. That is, the molded product is broken. Therefore, the ratio of the adhesion reducer in the composition is determined so that the shape of the molded product can be maintained. For example, as shown in the embodiments described later, the ratio of the adhesion reducer in the composition is determined so that the ratio of the adhesion reducer to the gelatin can be 0.6 to 118 parts by weight of the adhesion reducer to 100 parts by weight of the gelatin.

In addition to the adhesion reduce, another additive can be added to the composition according to the present disclosure. For example, a dispersant for dispersing the raw powder can be added.

Next, a method of manufacturing the sintered product from the composition, according to the present disclosure is described.

Firstly, the composition, in which the raw powder, the gelatin, the polar solvent, and the adhesion reduce are mixed together at a predetermined ratio, is prepared. Then, the molded product is manufactured by injection molding of the prepared composition.

At this time, until the composition is injected in the molding die, the composition remains heated to a temperature higher than the solation temperature so that the composition can have the fluidity. After the composition is injected in the molding die, the composition is cooled to a temperature lower than the gelation temperature. Thus, the composition is hardened so that the molded product can be manufactured. According to the present disclosure, since the composition contains the adhesion reducer, the molded product can be removed from the molding die without being broken.

Then, the molded product is dried and sintered so that the sintered product having a predetermined shape can be manufactured. It is noted that the gelatin is decomposed and removed in the sintering process.

In the above explanation, the molded product is manufactured by an injection molding method using the composition according to the present disclosure. The molded product can be manufactured not only by an injection molding method but also by other molding methods, which use a molding die, such as a transfer molding method, a compression molding method, or an extrusion molding method.

Assuming that the raw powder contains a ceramic particle, examples of the sintered product manufactured from the composition according to the present disclosure include an insulator of a spark plug of an internal-combustion engine, an $O_2$ sensor for detecting the concentration of oxygen in the exhaust gas, and an IC (integrated circuit) board. When the raw powder contains a metal powder, the sintered product can have electrical conductivity.

EMBODIMENTS

Embodiment 1

In the embodiment 1, an alumina sintered product was manufactured.

A mixed powder was prepared by mixing 100 parts by weight of low soda alumina with an average particle diameter of 2.5 µm, 8.5 parts by weight of acid-treated beef bone gelatin (jelly strength of 300 g) made by Nitta Gelatin Inc., 0.4 parts by weight (active ingredient) of SN-Thickener 665T (adhesion reducer: urethane modified polyether) made by SAN NOPCO Ltd., 0.5 parts by weight (active ingredient) of SN-Dispersant 5023 (dispersing agent) made by SAN NOPCO Ltd, and pure water in a mixer for one minute. At this time, the pure water was added so that the amount of water in the composition that passed a kneading machine can be 10.0 wt % of the composition.

The prepared mixed powder was kneaded in the kneading machine and then pelletized to obtain a pellet with a size of φ3 mm×10 mm. This pellet was placed in an injection molding machine, to form a rod-shaped molded product having a size of φ10 mm×L30 mm. This injection molding was performed under conditions that a material temperature is 45° C. and a molding die temperature is 13° C. After the injection molding, the molded product was able to be removed from the molding die without being broken.

Then, the molded product was dried in a constant temperature bath of 30° C. for 24 hours and then sintered in a sintering furnace. In the drying process, the moisture content of the molded product was reduced to 2% or less. In the sintering process, a temperature was increased up to 1600° C. at a speed of 100° C./hour, maintained at 1600° C. for 2 hours, and then reduced. Thus, the alumina sintered product was manufactured.

Embodiment 2

In the embodiment 2, a zirconia sintered product was manufactured.

A mixed powder was prepared by mixing 100 parts by weight of zirconia with an average particle diameter of 0.4 µm, 10 parts by weight of acid-treated beef bone gelatin (jelly strength of 300 g) made by Nitta Gelatin Inc., 0.4 parts by weight (active ingredient) of PEG400 (polyoxyethylene glycol, molecular weight of 400) made by Sanyo Chemical Industries, Ltd., 0.5 parts by weight (active ingredient) of SN-Dispersant 5023 (dispersing agent) made by SAN NOPCO Ltd, and pure water in a mixer for one minute. At this time, the pure water was added so that the amount of water in the composition that passed a kneading machine can be 18 wt % of the composition.

The molded product was formed from the prepared mixed powder by performing the injection molding process and the kneading process under the same condition as the first embodiment. After the injection molding, the molded product was able to be removed from the molding die without being broken.

Then, the molded product was dried under the same condition as the first embodiment and sintered. In the drying process, the moisture content of the molded product was reduced to 2% or less. In the sintering process, a temperature was increased up to 1400° C. at a speed of 100° C./hour, maintained at 1400° C. for 2 hours, and then reduced. Thus, the zirconia sintered product was manufactured.

Embodiments 3-12 and Comparison Examples 1-4

The demoldability of compositions, which were prepared by replacing the adhesion reducer in the composition of the embodiment 1 with any of compounds shown in FIG. 1, was evaluated. The mixing ratio was the same as the embodiment 1. The compounds of the embodiments 3, 7, 8, 10, 11, and 12 shown in FIG. 1 are water-soluble, and the compounds of the embodiments 4, 5, 6, and 9 shown in FIG. 1 are water-dispersible.

Specifically, the demoldability was evaluated by evaluating the degree of adhesion (stickiness) of the composition to a metal screw inside a testing machine, which is designed for kneading-extrusion molding evaluation, after the composition was kneaded in the testing machine and removed from the testing machine. When the adhesion of the composition to the screw was so weak that the removal of the composition could be: easy, the demoldability was evaluated as "O". When the adhesion of the composition to the screw was so strong that the removal of the composition could be hard or so that the composition could be partially left on the screw, the demoldability was evaluated as "X".

As shown in FIG. 1, for the compounds of the comparison examples 1-4, each having the HLB value less than 10, the demoldability was evaluated as "X". In contrast, for the compounds of the embodiments 3-12, each having the HLB value ranging from 10 to 20, the demoldability was evaluated as "O". The compound used in the embodiment 3 is the same compound used as the adhesion reducer in the embodiment 2. The compound used in the embodiment 4 is the same compound used as the adhesion reducer in the embodiment 1. Therefore, when the molded product is formed from the composition in which any of the compounds of the embodiments 3-12 is mixed as an adhesion reducer, it is expected that the molded product can be removed from the molding die without being broken like in the embodiments 1 and 2.

Embodiments 13, 14 and Comparison Examples 5, 6

Like in the embodiment 3, polyoxyethylene glycol (PEG400 made by Sanyo Chemical Industries, Ltd) was used, and the demoldability of the composition in which this compound was mixed at a ratio shown in FIG. 2 was evaluated. In FIG. 2, a ratio A on the left side indicates a mixing ratio of the compound to 100 parts by weight of the raw powder, and a ratio B on the right side indicates a mixing ratio of the compound to 100 parts by weight of the gelatin (the same is true in FIGS. 3 and 4 below). A mixing ratio between the raw powder, the gelatin, and the water was the same as that in the embodiment 1.

Like in the embodiment 3, the demoldability was evaluated by evaluating the degree of adhesion (stickiness) of the composition to the metal screw inside the testing machine, after the composition was kneaded in the testing machine and removed from the testing machine. When the adhesion of the composition to the screw was so weak that the removal of the composition could be easy, the demoldability was evaluated as "O". When the adhesion of the composition to the screw was so strong, due to a shortage of the mixed compound, that the removal of the composition could be hard or that the composition could be partially left on the screw, the demoldability was evaluated as "X". Further, when the particles of the raw powder were not coupled together due to an excessive amount of the mixed compound, so that the removed composition could not maintain the shape due to the fact that the composition was easily deformed by stress not greater than stress, which was applied to the composition when the composition was removed from the molding die, the demoldability was evaluated as "X".

Embodiments 15-17 and Comparison Examples 7, 8

Like in the embodiment 7, polycarboxylic acid ammonium salt (A-6114 made by Toagosei Co., Ltd.) was used, and the demoldability of the composition in which this compound was mixed at a ratio shown in FIG. 3 was evaluated. A mixing ratio between the raw powder, the gelatin, and the water was the same as that in the embodiment 1. The demoldability was evaluated in the same method as in the embodiments 13 and 14.

Embodiments 18-20 and Comparison Examples 9, 10

Like in the embodiment 12, oligosaccharide derivative (PO-20 made by Mitsubishi Shoji Foodtech Co., Ltd.) was used, and the demoldability of the composition in which this compound was mixed at a ratio shown in FIG. 4 was evaluated. A mixing ratio between the raw powder, the gelatin, and the water was the same as that in the embodiment 1. The demoldability was evaluated in the same method as in the embodiments 13 and 14.

As shown in FIGS. 2-4, in each of the cases of polyoxyethylene glycol, polycarboxylic acid ammonium salt, and oligosaccharide derivative, when the mixing ratio is 0.6 to 118 parts by weight of the compound to 100 parts by weight of the gelatin (refer to the mixing ratio B), the demoldability was evaluated as "O".

From these results, when the molded product is formed from the composition in which any of the adhesion reducers of the embodiments shown in FIG. 1 is mixed in such a manner that the mixing ratio is 0.6 to 118 parts by weight of the adhesion reducer to 100 parts by weight of the gelatin, it is expected that the molded product can be removed from the molding die without being broken like in the embodiments 1 and 2. Further, by mixing the adhesion reducer and the gelatin at the above mixing ratio, it is expected that the molded product can be removed from the molding die without being broken like in the embodiments 1 and 2, even when the mixing ratio of the gelatin in the composition is different from those of the embodiments.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A plastic molding composition used to mold a molded product in a molding die, the plastic molding composition comprising:
   a powder containing at least one of a ceramic particle and a metal particle;
   gelatin;
   a polar solvent; and
   an adhesion reducer that, after the molding composition has been hardened into the molded product, reduces adhesion of the gelatin to the molding die so that the molded product can be removed from the molding die without being broken; wherein
   the adhesion reducer is a water-soluble or water-dispersible compound,
   the adhesion reducer has a HLB value, calculated by Griffin's method, ranging from 10 to 20, and
   the water-soluble or water-dispersible compound is urethane modified polyether.

2. The plastic molding composition according to claim 1, wherein a mixing ratio of the compound to the gelatin is 0.6 to 118 parts by weight of the water-soluble or water-dispersible compound to 100 parts by weight of the gelatin.

3. A sintered product manufactured by molding and sintering the plastic molding composition according to claim 1.

4. A sintered product manufactured by molding and sintering the plastic molding composition according to claim 2.

5. The plastic molding composition according to claim 1, wherein the metal particle is an alumina particle or a zirconia particle.

6. The plastic molding composition according to claim 1, wherein the polar solvent is an alcohol having a volatility equal to or lower than the volatility of water.

7. The plastic molding composition according to claim 1, wherein the polar solvent is water.

* * * * *